US Patent 3,567,748
Patented Mar. 2, 1971

3,567,748
THE REACTION PRODUCT OF ISOPROPENYL STEARATE WITH DIETHYLMALONATE OR METHYL STEARATE AND THE CATALYZED PRODUCTION THEREOF

Edward S. Rothman, Philadelphia, Pa., assignor to the United States of America as represented by the Secretary of Agriculture
No Drawing. Continuation-in-part of application Ser. No. 549,806, May 13, 1966. This application Nov. 2, 1967, Ser. No. 680,052
Int. Cl. C11c 3/14
U.S. Cl. 260—410.9                                     4 Claims

ABSTRACT OF THE DISCLOSURE

Isopropenyl stearate and a high boiling ester such as methyl stearate or diethylmalonate are heated in the presence of a proton-providing acid catalyst to produce a novel compound, described hereinafter, which functions as a chelating agent and is useful as a metal complexing agent.

---

This application is a continuation-in-part of application bearing Ser. No. 549,806, filed May 13, 1966, now abandoned.

A non-exclusive, irrevocable, royalty-free license in the invention herein described, throughout the world for all purposes of the United States Government, with the power to grant sublicenses for such purposes, is hereby granted to the Government of the United States of America.

This invention relates to the preparation of a novel compound characterized by the following properties: double M.P. at 70° C. and 75° C.; IR absorption bands at 1774, 1737, 1644, and 1109 cm.$^{-1}$ and no hydroxyl bands in $CS_2$ solution; UV peak at 298 m$\mu$, log $\epsilon + 3.48$; MW of 648 by mass spectrometer; NMR $\delta = 5.22$ (singlet), 4.31 (quartet), 0.89, 1.30, and 2.20 p.p.m.; an empirical formula of $C_{41}H_{76}O_5$; and which hydrolyzes in strong KOH to methyl heptadecyl ketone. This novel compound functions as a chelating agent and hence has utility as a metal complexing and metal removing agent. The chelate salts of certain metallic ions, such as copper, are useful in lubricant compositions.

According to the present invention isopropenyl stearate and a high boiling ester such as methyl stearate or diethylmalonate, in the presence of a catalytic amount of a proton providing acid, such as p-toluenesulfonic acid or methanesulfonic acid, are heated to about the reflux temperature of the resulting mixture until the reaction is substantially complete.

In the presence of the high boiling ester and the acid catalyst, the reaction is considered to be a molecular rearrangement.

Upon cooling the reaction mixture, a crystalline solid precipitates and is readily purified by conventional procedures such as recrystallization or column chromatography techniques. The major by-product of the reaction appears to be acetone.

The role of a high boiling ester is not clearly understood. In addition to being a diluent, it apparently helps direct the course of the reaction. Regardless of the reason, the presence of a high boiling ester, such as methyl stearate or diethylmalonate provides unique results.

While the particular high boiling ester employed in the reaction mixture is not considered critical to the inventive process, it is considered desirable to employ an ester having a sufficiently high boiling point, such as about 175° C., in order to facilitate the speed of the reaction. While the amount of the high boiling ester used in the mixture may be varied over a considerable range, the process is exemplified with the use of approximately equimolar or equivolume parts of isopropenyl stearate and the high boiling ester.

The preferred proton-providing catalyst is of the sulfonic acid type; an aromatic sulfonic acid such as p-toluenesulfonic acid or an alkyl sulfonic acid such as methane sulfonic acid or ethane sulfonic acid. The sulfonic acid need be present only in a catalytic amount, and the about 0.5% by weight added to the mixtures of the examples is not considered a critical limitation.

The following examples are presented as illustrative of the invention.

EXAMPLE 1

Isopropenyl stearate 8.03 grams (0.0247 mole), diethylmalonate (B.P. 193° C.), 10.0 ml., and p-toluenesulfonic acid monohydrate (80 mg.) were heated to reflux (pot temperature 185° C.). Soon after reflux acetone liberation was evident, and acetone vapors escaped the short condenser and were trapped in an auxiliary condensing system. The acetone collected and converted to the 2,4-dinitrophenylhydrazone corresponded to 130 mg. of acetone. The refluxing was stopped after 1.5 hours. The orange brown mixture on cooling deposited crystals. Recrystallization from pentane gave the product having double melting point at 70° C. and 75° C. The infrared spectrum of the product in carbon disulfide solution showed principal bands at 1774, 1737, 1644, and 1109 cm.$^{-1}$. No hydroxyl bands were noticed in $CS_2$ solution, but the ultraviolet spectrum in iso-octane showed a maximum at 298 m$\mu$, log $\epsilon + 3.48$. The product was also found to have a MW of 648 by mass spectrometer; NMR $\delta = 5.22$ (singlet), 4.31 (quartet), 0.89, 1.30, and 2.20 p.p.m.; an empirical formula of $C_{41}H_{76}O_5$; and hydrolyzes in strong KOH to methyl heptadecyl ketone.

EXAMPLE 2

Isopropenyl stearate 13.22 g. (0.04 mole), methyl stearate 12.16 g. (0.04 mole), and p-toluenesulfonic acid monohydrate (120 mg.) were heated from 180° to 198° for forty minutes during which time acetone evolution in the melt was observable. Chromatography on a magnesium silicate (Florisil) support separated the product from unused solvent methyl stearate. The separation can be done alternatively by direct crystallization since the product is less soluble in pentane than is methyl stearate. The physical properties of the product were identical with those reported in Example 1.

The isopropenyl stearate was prepared by the sulfuric acid catalyzed interchange reaction of stearic acid with commercially available isopropenyl acetate as described in J. Org. Chem. 27, 3123 (1962).

I claim:

1. A process comprising heating to about reflux temperature a mixture consisting essentially of isopropenyl stearate, an ester selected from the group consisting of diethylmalonate and methyl stearate, and at least a catalytic amount of p-toluenesulfonic acid, until the reaction is substantially complete.

2. The process of claim 1 in which the ester is diethylmalonate.

3. The process of claim 1 in which the ester is methyl stearate.

4. The product produced by the process of claim 1.

No references cited.

LORRAINE A. WEINBERGER, Primary Examiner
R. S. WEISSBERG, Assistant Examiner